No. 744,592. PATENTED NOV. 17, 1903.
J. N. MOULTON.
BOOT OR SHOE.
APPLICATION FILED AUG. 14, 1903.
NO MODEL.

Witnesses:
Horace A. Crossman
Everett L. Emery

Inventor:
James N. Moulton
by Frederick L. Emery
Atty.

No. 744,592. Patented November 17, 1903.

UNITED STATES PATENT OFFICE.

JAMES N. MOULTON, OF PHILADELPHIA, PENNSYLVANIA.

BOOT OR SHOE.

SPECIFICATION forming part of Letters Patent No. 744,592, dated November 17, 1903.

Application filed August 14, 1903. Serial No. 169,467. (No model.)

*To all whom it may concern:*

Be it known that I, JAMES N. MOULTON, a citizen of the United States, residing at Philadelphia, in the county of Philadelphia and State of Pennsylvania, have invented an Improvement in Boots or Shoes, of which the following description, in connection with the accompanying drawings, is a specification, like letters on the drawings representing like parts.

My invention aims to provide a novel and improved boot or shoe having a rubber sole or tap and means for attaching the said sole or tap, and the nature of my invention will best be understood from a description of one embodiment thereof—such, for instance, as that illustrated in the accompanying drawings, wherein—

Figure 1:
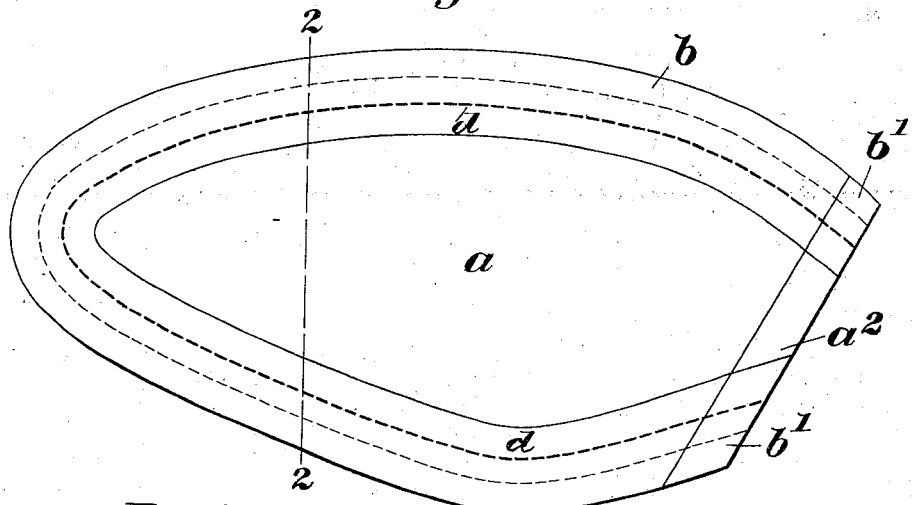
Figure 3:
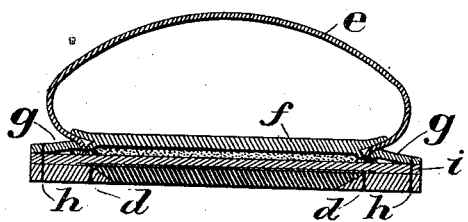
Figure 2:
Figure 4:
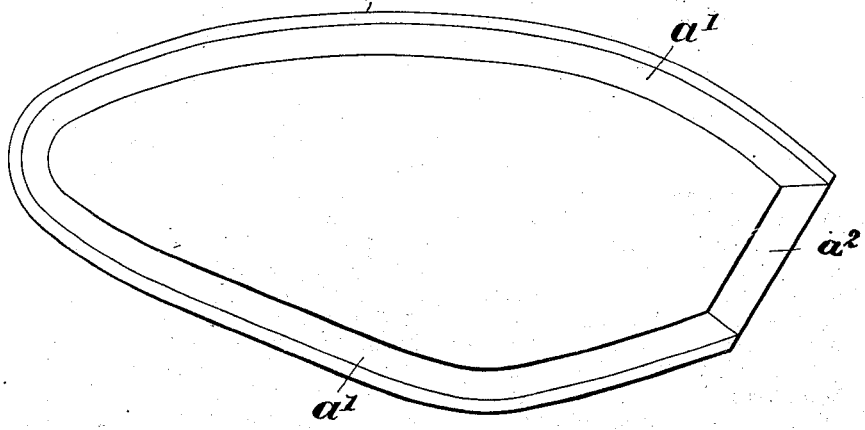

Figure 1 is a face view looking at the bottom or tread face of a tap or sole made in accordance with my invention; Fig. 2, a cross-section thereof on the dotted line 2 2; Fig. 3, a cross-section through a part of a boot or shoe fitted with a sole or tap, illustrating my invention; and Fig. 4, a tread-face view of the rubber body portion of the sole.

In the particular embodiment of my invention selected for illustration herein and shown in the drawings the sole or tap comprises the body $a$ and the rim portion or welt $b$. The body is preferably of india-rubber or rubber composition, or it may be other waterproof or water-resistant substance, preferably molded to desired shape and with its edges (see Figs. 2 and 4) beveled, as shown at $a'$. This body $a$ is reinforced at its inner face, opposite the tread, by a piece of fabric $c$, such as duck, shaped to correspond with the shape of the body $a$ and of a size such that its edges will project laterally beyond the periphery of the body $a$ to form welt-supporting lips $c'$. This reinforcing fabric may be applied in suitable manner to the body $a$, but I prefer that it shall be applied by placing it upon the body of rubber before it is compressed in the mold, so that in the act of compressing it will be firmly impressed into and upon the rubber composition, to which it becomes yet more firmly attached during the process of vulcanizing. This fabric also is preferably in and of itself coated or impregnated with rubber, so as to render it substantially waterproof, whether this impregnation be accomplished simultaneously with the molding operation or prior to the application of the fabric to the composition which is to constitute the body $a$. The welt $b$ is of leather molded to shape and with its inner edge beveled to correspond with and fit the bevel at the periphery of the body $a$. This welt is applied to the body, as indicated in Figs. 1, 2, and 3, with its beveled inner edge in contact with the beveled periphery of the body, the welt itself being seated upon the rubber-coated lip $c'$, projecting beyond the beveled edge of the body. The lip $c'$ is so narrow relatively to the width of the welt that its edge is concealed when the welt is attached to the shoe, the welt along its line of attachment abutting directly against the sole or body to which it is attached and wholly concealing the lip. The tap or sole thus constructed may be applied to and form a part of a shoe in precisely the manner in which ordinary soles or taps are applied, provided, however, that the fastenings, preferably stitches, which penetrate the welt shall be located outside of and beyond the canvas lip $c'$. This is best illustrated by Fig. 3, wherein the shoe-upper is indicated at $e$, the inner sole at $f$, the welt at $g$, all of which are as usual in ordinary welt-shoes, my improved sole being stitched to the welt $g$ precisely as if it were the ordinary sole or tap by stitches $h$, so long as the said stitches, as stated, fall outside the lip $c'$, with or without the interposition of an intermediate sole $i$. By this construction the leather welt-strip $b$ directly contacts with the attaching-surface presented by the shoe-welt $g$, enabling the stitches to furnish a firm attachment without the structural weakness or objectionable appearance which would result if the canvas were extended completely to the outer edge of the sole, where it would quickly deteriorate and by reason of its nature would prevent proper setting of the sole edge. After having been attached to the shoe the outer edge of the welt $b$ may be trimmed, as with the ordinary sole, and the rear ends of the welt-strip scarfed off at $b'$ to a bevel, which shall correspond with the bevel $a^2$ at the rear or shank end of the body $a$. This provides a neat finish, well adapted for taps to be applied to the outer soles of shoes of any construction.

The construction described possesses many features of merit. For instance, the leather welt $b$ by its direct contact with the attaching-surface of the shoe provides sufficiently firm attachment of the rubber tap as a whole to the shoe to insure the requisite durability, and the canvas or fabric reinforcing member $c$ insures secure attachment of the welt to the body $a$, which would not be the case if the stitches securing the welt were permitted to pass merely through the rubber composition, which does not securely hold stitches. Furthermore, by projecting the canvas or fabric lip laterally beyond the body $a$ and permitting the welt to be seated directly thereupon, as illustrated, a firm seat is obtained, which insures stability and permanency of the sole and its attachment to the shoe. The fact that this projecting lip is waterproofed, as described, is further advantageous, because it tends to prevent any moisture which may be taken up by the leather welt from working through to the inside of the shoe.

The shank end of the tap $a^2$ may be secured by cable-screws, cement, pegs, or otherwise, according to the preference of the user.

My invention is not restricted to the particular embodiment thereof here shown and described, but may be varied within the spirit and scope of the invention as defined by the claim.

I claim—

In a boot or shoe the combination of an inner sole and a sole-attaching surface of leather of an outer sole applied thereto and comprising a rubber body having its entire peripheral edge beveled outwardly in a direction from its outer toward its inner faces, a reinforcing and body-attaching fabric applied to the inner face of said body and projecting as a narrow attaching-lip beyond said beveled edge around the side and toe portions only of said body, a welt-like strip inclosing the side and toe portions only of said body and seated at its inner edge upon said fabric lip, said welt-strip being beveled at its inner edge to fit said body-bevel and secured to said fabric by through-and-through fastenings with said beveled-edged body clamped firmly and locked therebetween, said outer sole being applied to said shoe with said welt-strip in contact with said sole-attaching surface outside said fabric lip, and a line of fastenings also outside said lip and penetrating said welt-strip and sole-attaching surface for attaching said outer sole to said shoe, substantially as described.

In testimony whereof I have signed my name to this specification in the presence of two subscribing witnesses.

JAMES N. MOULTON.

Witnesses:
FREDERICK L. EMERY,
OTTO P. OSMERS.